United States Patent [19]

Takada

[11] Patent Number: 5,914,992
[45] Date of Patent: *Jun. 22, 1999

[54] HUNTING SUB-FRAME PATTERNS DISTRIBUTED IN SUB-FRAMES OF A TRANSMISSION SIGNAL

[75] Inventor: Tadayuki Takada, Kawasaki, Japan

[73] Assignee: Fujitsu Limited, Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/824,452

[22] Filed: Mar. 26, 1997

Related U.S. Application Data

[63] Continuation of application No. 08/025,437, Mar. 3, 1993, abandoned.

[30] Foreign Application Priority Data

Mar. 3, 1992  [JP]  Japan .................................. 4-045241

[51] Int. Cl.$^6$ .................................. H04L 7/00; H04J 3/06
[52] U.S. Cl. ........................ 375/366; 375/368; 370/513
[58] Field of Search .................................. 375/340, 357, 375/365, 367, 368; 1/1; 327/141, 162, 160, 161, 155, 156, 157, 158, 159; 370/503, 509, 510, 511, 512, 513, 514

[56] References Cited

U.S. PATENT DOCUMENTS

| 4,525,840 | 7/1985 | Heinz et al. | 375/366 |
| 4,694,473 | 9/1987 | Etoh | 370/106 |
| 4,807,248 | 2/1989 | Pyatt et al. | 375/366 |
| 4,849,995 | 7/1989 | Takeo et al. | 375/368 |
| 5,140,618 | 8/1992 | Kinoshita et al. | 375/368 |

*Primary Examiner*—Chi H. Pham
*Assistant Examiner*—William Luther
*Attorney, Agent, or Firm*—Helfgott & Karas, P.C.

[57] ABSTRACT

In a synchronizing system searching for k sub-frame patterns respectively distributed in k sub-frames in one frame of data transmitted via a transmission line where k is an integer, a frame pattern detection unit sequentially detects one of the k sub-frame patterns with a predetermined period. A control unit causes the pattern detection unit to detect an (i+1)th sub-frame pattern at the predetermined frame period after the pattern detection unit detects an ith sub-frame pattern where i=1, 2, . . . , k.

5 Claims, 8 Drawing Sheets

HUNTING SUB-FRAME PATTERNS DISTRIBUTED IN SUB-FRAMES OF A TRANSMISSION SIGNAL

This is a continuation of application Ser. No. 08/025,437, filed Mar. 3, 1993 now abandoned.

BACKGROUND OF THE INVENTION

1. Field of the Invention

The present invention generally relates to a digital communications device used in a digital communications network, and more particularly to a synchronizing system provided in a digital receiver system and designed to detect distributed frame patterns distributed in a main frame of a transmission signal.

2. Description of the Prior Art

FIG. 1 shows a frame format of a main frame of a transmission signal transferred in a digital communications network. A main frame 1, which consists of n bits, includes first and second sub-frames 2 and 3. Each of the first and second sub-frames 2 and 3 consists of m bits (m<n). The first sub-frame 2 includes a p-bit sub-frame pattern (F1) 2a located at the beginning portion of the first sub-frame 2. The second sub-frame 3 includes a p-bit sub-frame pattern (F2) 2b located at the beginning portion of the second sub-frame 3.

A digital receiver system in a digital communications device detects the sub-frame patterns 2a and 3a from a digital signal received via a transmission line, and separates data 2b contained in the first sub-frame 2 and data 3b contained in the second sub-frame 3 from each other at timings based on the detected sub-frame patterns 2a and 3a.

FIG. 2 is a block diagram of a synchronizing system provided in the digital receiver system. A timing generator (TIMGEN) 11 divides the frequency of an external clock signal CLK and thereby generates various timing signals corresponding to bit allocations in the main frame 1. Examples of the timing signals generated by the timing generator 11 are a separation timing signal for separating the pieces 2b and 3b of data from each other, and sub-frame pattern timing signals FP1 and FP2 for detecting the frame patterns 2a and 3a respectively.

A first frame pattern detector (F1 DET) 12 detects the same pattern as the first sub-frame pattern 2a contained in the first sub-frame 2 in the main frame 1 of data received via the transmission line. More particularly, the first frame pattern detector 12 compares P consecutive bits from the starting (first) bit with the sub-frame pattern (F1) 2a. When the P consecutive bits form the sub-frame pattern 2a, the first sub-frame pattern detector 12 generates a detection signal FP1D. As shown in FIG. 3(a), the detection signal FP1D is a pulse signal that rises each time the sub-frame pattern (F1) 2a is detected.

A second sub-frame pattern detector (F2 DET) 13 detects the same pattern as the second sub-frame pattern 3a contained in the second sub-frame 3 in the main frame 1 of data received via the transmission line More particularly, the second sub-frame pattern detector 13 compares P consecutive bits from the (m+1)th bit with the sub-frame pattern (F2) 3a. When the P consecutive bits form the sub-frame pattern 3a, the second sub-frame pattern detector 13 generates a detection signal FP2D, which is a pulse signal that rises each time the sub-frame pattern (F2) 3a is detected.

A mismatch detector 14 determines whether or not the detection signal FP1D related to the sub-frame pattern 2a is received at the timing of the sub-frame pattern timing signal FP1 generated by the timing generator 11. When the result of the above determination is negative, the mismatch detector 14 determines that the receiver system is out of phase with respect to the first sub-frame 2, and outputs a high-level signal (mismatch detection signal) to a negative-logic OR gate (which corresponds to a positive-logic AND gate) 16. As will be described in detail later, a negative-logic OR gate 18 outputs a high-level signal to a negative-logic OR gate 19 in response to the mismatch detection signal Hence, the OR gate 19 prevents the external clock signal CLK from passing therethrough. That is, the output signal of the OR gate 19 is fixed at the high level. Hence, the timing generator 11 fixes the sub-frame pattern timing signal FP1 at the high level. When the mismatch detector 14 determines that the sub-frame pattern detection signal FP1D is received while the sub-frame pattern timing signal FF1 is fixed at the high level, the mismatch detector 14 generates a low-level signal (match detection signal). It will be noted that the sub-frame pattern detection signal FP1D is received when the sub-frame pattern timing signal FP1 is received if the receiver system is synchronized with the first sub-frame 2.

A mismatch detector 15 determines whether or not the detection signal FP2D related to the sub-frame pattern 3a is received at the timing of the sub-frame pattern timing signal FP2 generated by the timing generator 11. When the result of the above determination is negative, the mismatch detector 15 determines that the receiver system is out of phase with respect to the second sub-frame 3, and outputs a high-level signal (mismatch detection signal) to the negative-logic OR gate 16. Then the negative-logic OR gate 18 outputs the high-level signal to the negative-logic OR gate 19 in response to the mismatch detection signal. Hence, the OR gate 19 prevents the external clock signal CLK from passing therethrough. That is, the output signal of the OR gate 19 is fixed at the high level. Hence, the timing generator 11 fixes the sub-frame pattern timing signal FP2 at the high level. When the mismatch detector 15 determines that the sub-frame pattern detection signal FP2D is received while the frame pattern timing signal FP2 is fixed at the high level, the mismatch detector 15 generates a low-level signal (match detection signal) It will be noted that the sub-frame pattern detection signal FP2D is received when the sub-frame pattern timing signal FP2 is received if the receiver system is synchronized with the second sub-frame 3.

A synchronization protection circuit 17 has an input terminal connected to the OR gates 16 and 18, and an output terminal connected to the OR gate 18. When the unit 17 determines that the match detection signal has been repeatedly received a predetermined number of times, it outputs a low-level output signal to the OR gate 18. Hence, the OR gate 18 allows the low-level signal to pass through the OR gate 18. Until the match detection signal has been received the predetermined number of times, the unit 17 outputs a high-level output signal to the OR gate 18. The high-level output signal of the OR gate 18 is particularly referred to as a clock inhibit signal. It will be seen from the above that the synchronization protection circuit 17 is intended to ensure that the receiver system has been pulled into synchronization with the received data.

A description will now be given of the operation of the synchronizing system with reference to FIG. 3 related to the first sub-frame 2.

As shown in FIG. 3(a), the first sub-frame pattern detector 12 does not detect the frame pattern (F1) 2a at the third n-bit frame period due to data error or the like, and does not generate the sub-frame pattern detection signal FP1D. At this time, the mismatch detector 14 does not receive the sub-frame pattern detection signal FP1D when receiving the sub-frame pattern timing signal FP1. Hence, the mismatch detector 14 outputs the mismatch detection signal to the OR gate 16. In this case, the OR gate 19 prevents the external clock signal CLK from passing therethrough, and hence the timing generator 11 fixes the frame pattern timing signal FP1 at the high level, as shown in FIG. 3(b).

The first sub-frame pattern detector 12 detects the sub-frame pattern (F1) 2a at the fourth frame period as shown in FIG. 3(a). Since the frame pattern timing signal FP1 is maintained at the high level, the mismatch detector 14 outputs the low-level output signal (the match detection signal) to the OR gate 16. At this time, the synchronization protection circuit 17 does not change its output signal and maintains it at the high level. That is, the clock inhibit signal output from the OR gate 18 is still active. When the match detection signal has been received the predetermined number of times, the unit 17 changes the output signal from the high level to the low level. Then, the OR gate 19 starts once again to transfer the external clock signal CLK to the timing generator 11.

In the system processing the distributed sub-frame patterns 2a and 3a, it is required that the frame patterns 2a and 3a should be unique sub-frame patterns which do not occur in the data fields 2b and 3b shown in FIG. 1. A unified sub-frame pattern consisting of the combination of the frame patterns 2a and 3a will be unique and will not occur in the data fields 2b and 3b. However, in the synchronizing system shown in FIG. 2, the sub-frame patterns 2a and 3a are separately detected In this case, there is a possibility that a pseudo sub-frame pattern identical to the sub-frame pattern 2a or 3a may occur in the data field 2b or 3b.

FIG. 4(a) illustrates pseudo sub-frame patterns QFP which are the same as the true sub-frame pattern (F1) 2a. The first sub-frame detector 12 detects not only the true sub-frame pattern 2a but also the pseudo sub-frame pattern QFP. When the first sub-frame detector 12 detects the same pseudo sub-frame pattern as the sub-frame pattern 2a, the mismatch detector 14 generates the mismatch detection signal since the mismatch detector 14 does not receive the sub-frame pattern timing signal FP1 at that time. Hence, it is necessary to mask the sub-frame pattern detection signal FP1D while the sub-frame pattern timing signal FP1 is not being generated, in other words, for the n-bit period. Thereby, as shown in FIG. 4, only the true sub-frame pattern 2a can be detected and the synchronizing system is pulled in synchronization with the received data.

However, if the pseudo sub-frame pattern QFP is detected when the sub-frame pattern timing signal FP1 is generated, the mismatch detector 14 generates the match detection signal. Since the sub-frame pattern detection signal FP1D is masked (prevented from being applied to the mismatch detector 14) for the n-bit period, the true sub-frame pattern 2a is lost. In this manner, the synchronizing (hunting) operation is greatly affected by the pseudo frame pattern QFP, and it takes a long time to detect (hunt) the true sub-frame pattern and pull the receiving system into synchronization with the received data.

SUMMARY OF THE INVENTION

It is a general object of the present invention to provide a synchronizing system in which the above disadvantages are eliminated.

A more specific object of the present invention is to provide a synchronizing system capable of establishing synchronization rapidly than the aforementioned synchronizing circuit.

The above objects of the present invention are achieved by a synchronizing system searching for k sub-frame patterns respectively distributed in k sub-frames in one frame of data transmitted via a transmission line where k is an integer, the synchronizing system comprising:

pattern detection means for sequentially detecting one of the k sub-frame patterns with a predetermined period; and control means, coupled to the pattern detection means, for causing the pattern detection means to detect an (i+1)th sub-frame pattern with the predetermined period after the pattern detection means detects an ith sub-frame pattern where i=1, 2, . . . , k.

The above objects of the present invention are also achieved by a synchronizing system searching for k sub-frame patterns respectively distributed in k sub-frames in one frame of data transmitted via a transmission line where k is an integer, the synchronizing system comprising:

a plurality of synchronization detecting circuits respectively detecting the k sub-frame patterns; and selector means, coupled to the plurality of synchronization detecting circuits, for selectively causing the plurality of synchronization detecting circuits to detect the k sub-frame patterns, each of the plurality of synchronization detecting circuits comprising:

pattern detection means for sequentially detecting one of the k sub-frame patterns with a predetermined period; and control means, coupled to the pattern detection means, for causing the pattern detection means to detect an (i+1)th sub-frame pattern with the predetermined period after the pattern detection means detects an ith frame pattern where i=1, 2, . . . , k.

BRIEF DESCRIPTION OF THE DRAWINGS

Other objects, features and advantages of the present invention will become more apparent from the following detailed description when read in conjunction with the accompanying drawings in which.

DESCRIPTION OF THE PREFERRED EMBODIMENTS

Figure 5:
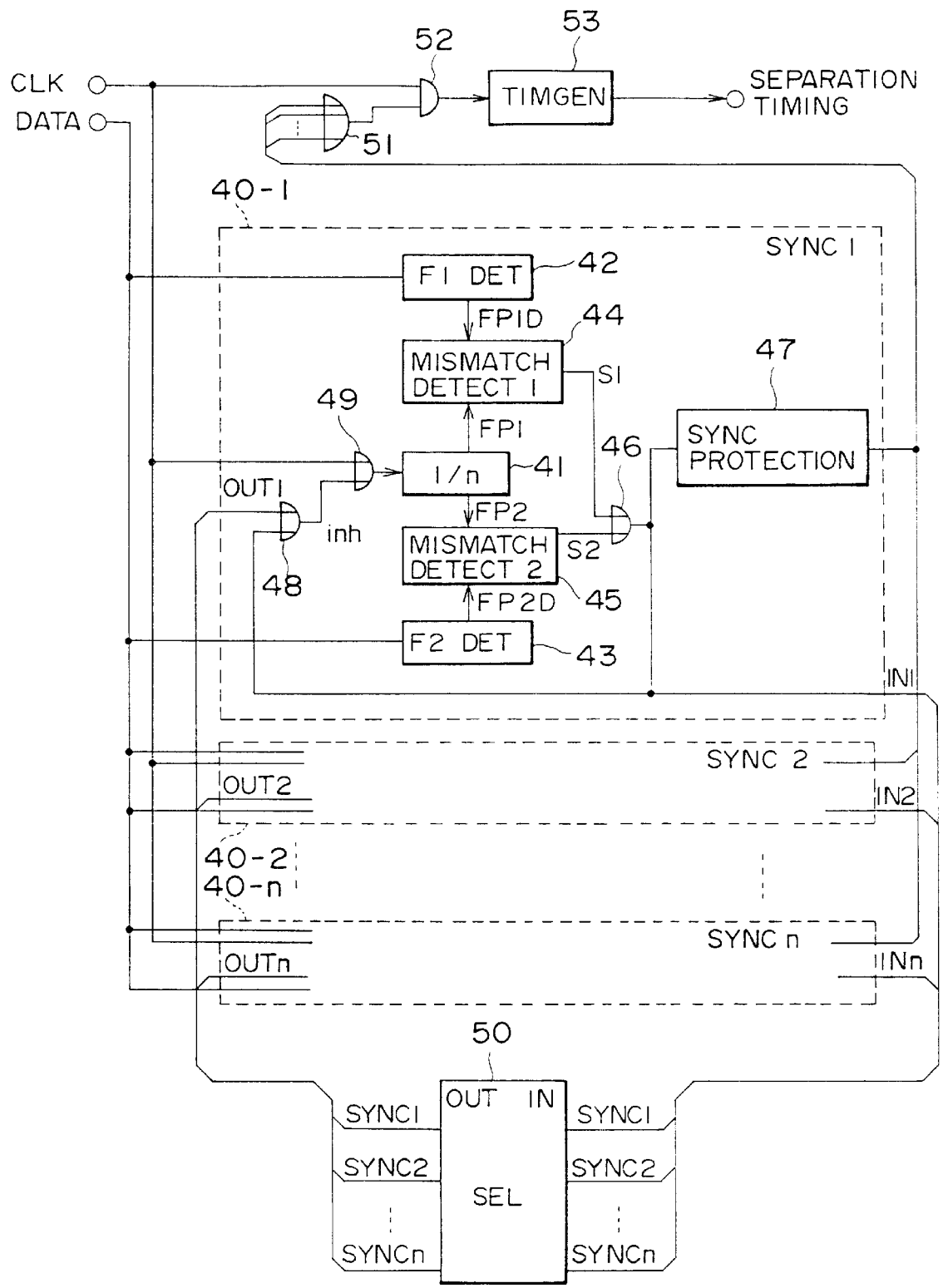
FIG. 5 is a block diagram of a synchronizing system according to a first embodiment of the present invention.

FIG. 5 is a block diagram of a synchronizing system according to a first embodiment of the present invention.

The synchronizing system shown in FIG. 5 is made up of a plurality of synchronization detecting circuits 40-1–40t (t is an integer), a selector 50, an OR gate 51, an AND gate 52, and a timing generator (TIMGEN) 53.

Figure 1:
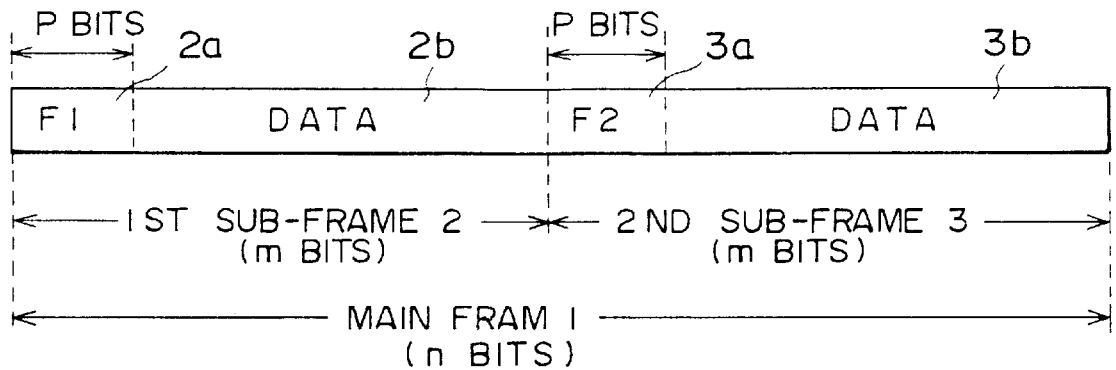
FIG. 1 is a diagram of a frame format.
Figure 2:
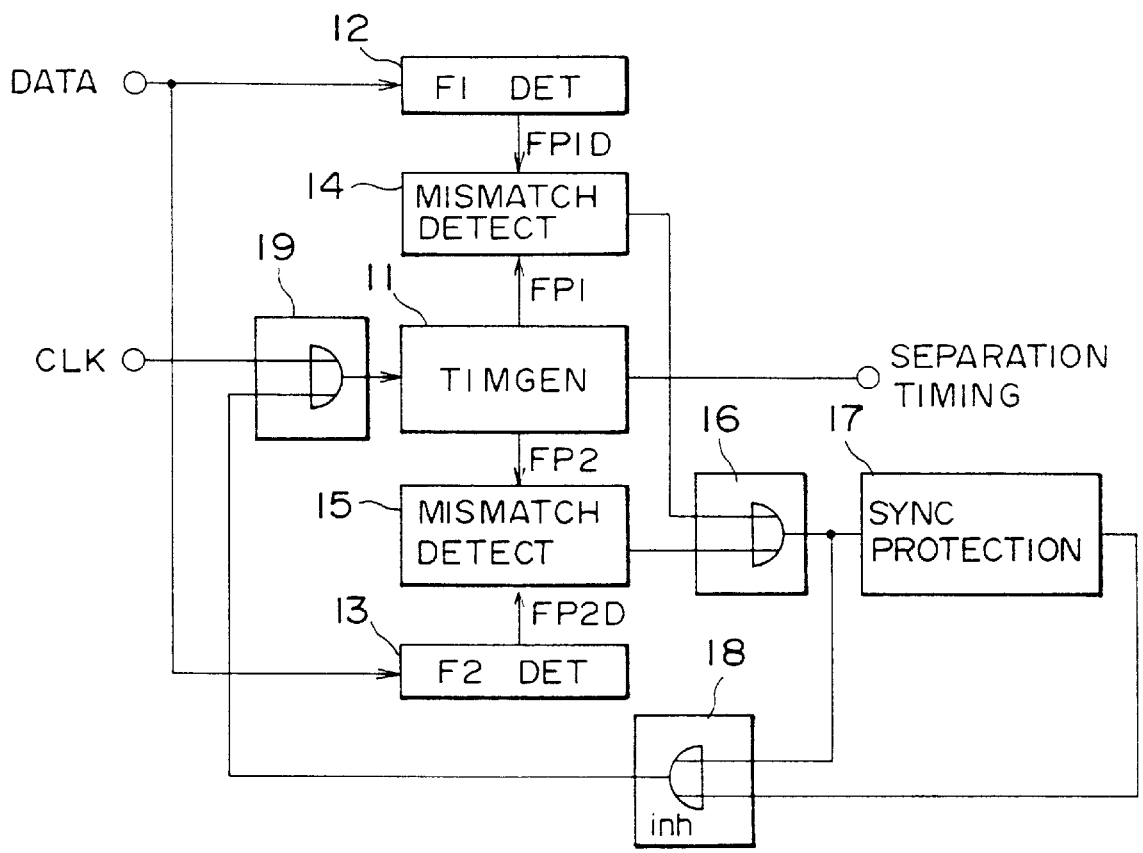
FIG. 2 is a diagram of a synchronizing system designed to handle the frame format shown in FIG. 1.
Figure 3:
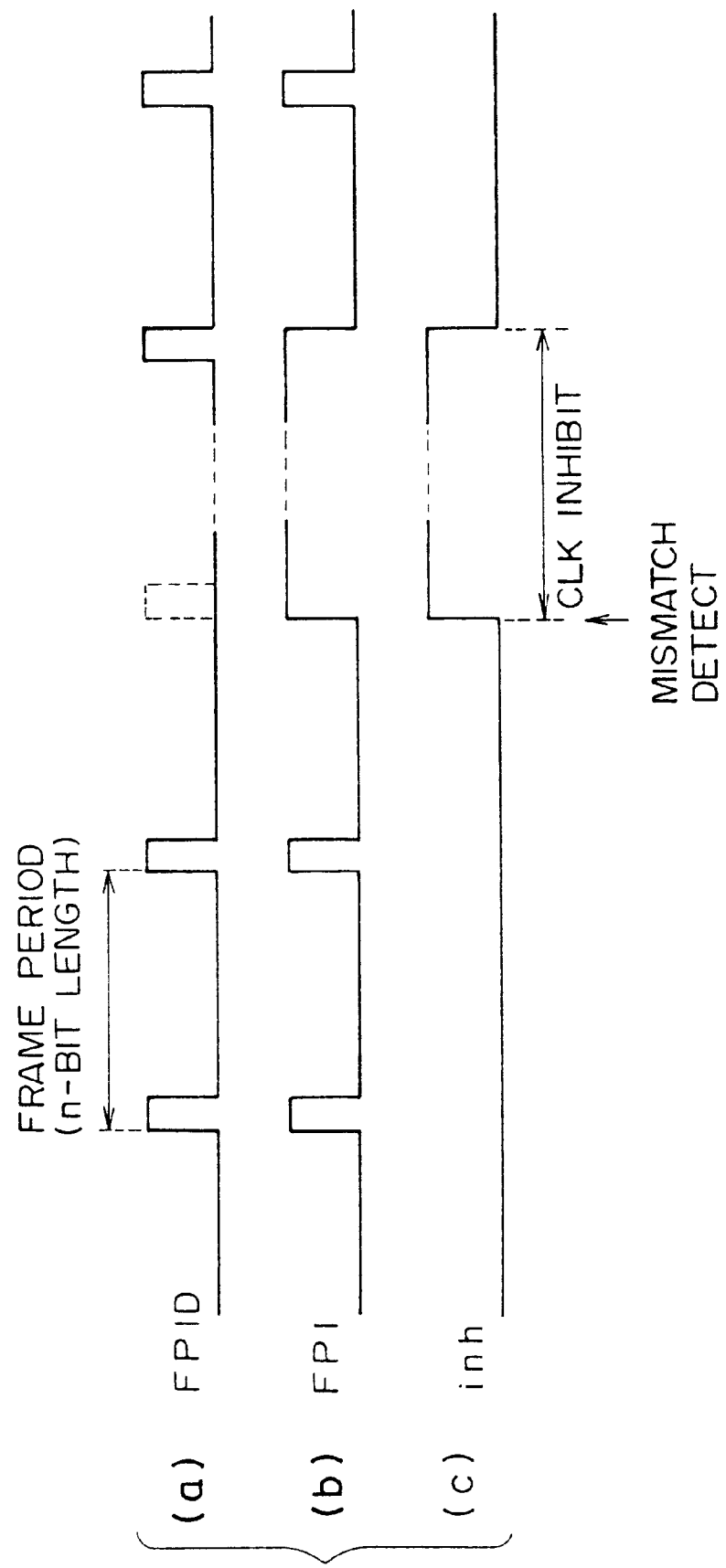
FIG. 3 is a timing chart showing the operation of the synchronizing system shown in FIG. 2.
Figure 4:
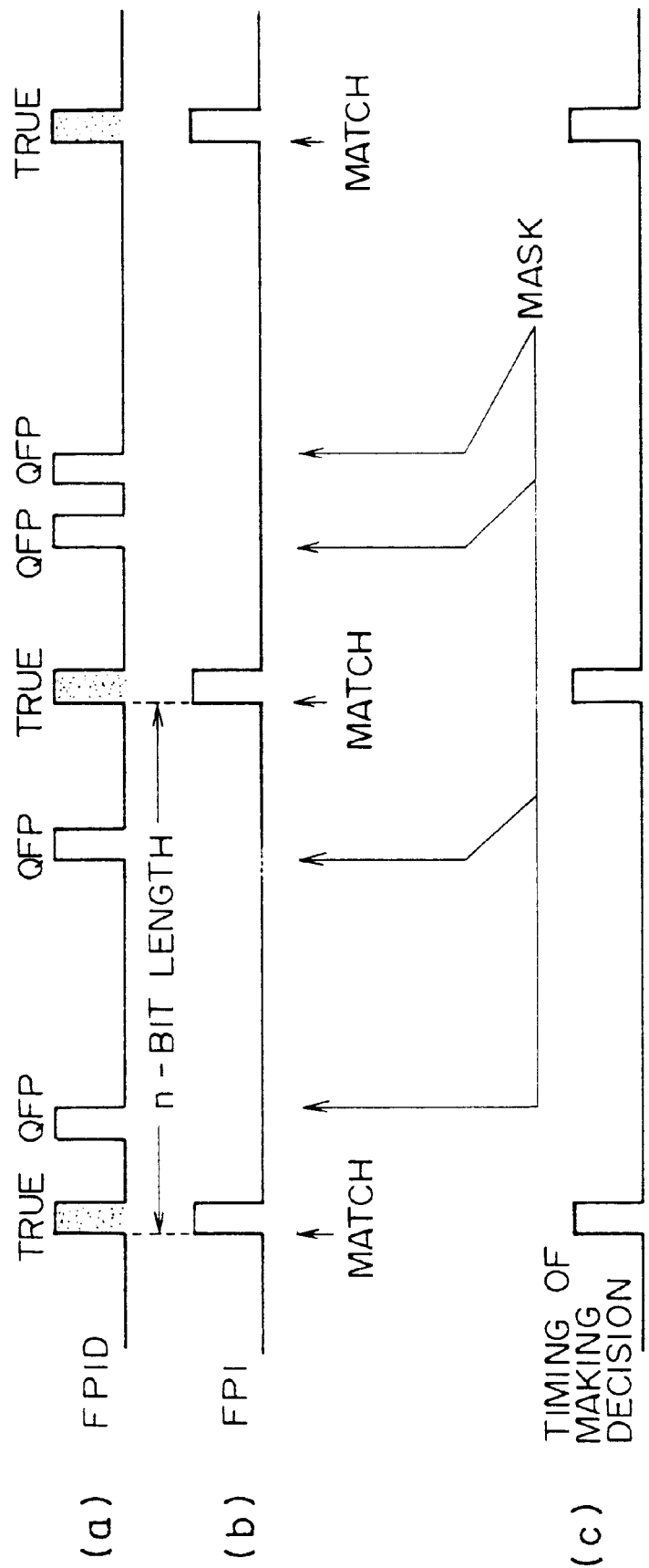
FIG. 4 is a timing chart showing the operation of an improved version of the synchronizing system shown in FIG. 2.

A frequency divider (1/N) 41 divides the frequency of an external clock signal CLK and thereby generates timing signals corresponding to bit allocations in the main frame 1 (FIG. 1). Examples of the timing signals generated by the timing generator 53 are a separation timing signal for separating the pieces 2b and 3b of data from each other, and sub-frame pattern timing signals FP1 and FP2 for detecting the sub-frame patterns 2a and 3a, respectively.

A first frame pattern detector (F1 DET) 42 detects the first sub-frame pattern 2a contained in the first sub-frame 2 in the main frame 1 of data received via the transmission line. More particularly, the first sub-frame pattern detector 42 compares P consecutive bits from the starting bit with the sub-frame pattern (F1) 2a. When the P consecutive bits form the frame pattern 2a, the first sub-frame pattern detector 42 generates a detection signal FP1D. The detection signal FP1D is a pulse signal generated each time the sub-frame pattern (F1) 2a is detected.

A second sub-frame pattern detector (F2 DET) 43 detects the same pattern as the second sub-frame pattern 3a contained in the second sub-frame 3 in the main frame 1 of data received via the transmission line. More particularly, the second sub-frame pattern detector 43 compares P consecutive bits from the (m+1)th bit with the sub-frame pattern (F2) 3a. When the P consecutive bits form the sub-frame pattern 3a, the second sub-frame pattern detector 43 generates a detection signal FP2D, which is a pulse signal that rises each time the sub-frame pattern (F2) 3a is detected.

A mismatch detector 44 determines whether or not the detection signal FP1D related to the sub-frame pattern 2a is received at the timing of the sub-frame pattern timing signal FP1 generated by the timing generator 53. When the result of the above determination is negative, the mismatch detector 44 determines that the receiver system is out of phase with respect to the first sub-frame 2, and outputs a high-level signal (mismatch detection signal) S1 to a positive-logic OR gate (which corresponds to a negative-logic AND gate) 46. As will be described in detail later, a positive-logic OR gate 48 outputs a high-level signal to a positive-logic OR gate 49 in response to the mismatch detection signal S1. Hence, the OR gate 49 prevents the external clock signal CLK from passing therethrough. That is, the output signal of the OR gate 49 is fixed at the high level Hence, the frequency divider 41 fixes the sub-frame pattern timing signal FP1 at the high level. When the mismatch detector 44 determines that the sub-frame pattern detection signal FP1D is received while the sub-frame pattern timing signal FP1 is fixed at the high level, the mismatch detector 44 generates a low-level signal (match detection signal) It will be noted that the sub-frame pattern detection signal FP1D is received when the sub-frame pattern timing signal FP1 is received if the receiver system is synchronized with the first sub-frame 2.

A mismatch detector 45 determines whether or not the detection signal FP2D related to the sub-frame pattern 3a is received at the timing of the sub-frame pattern timing signal FP2 generated by the frequency divider 41. When the result of the above determination is negative, the mismatch detector 45 determines that the receiver system is out of phase with respect to the second sub-frame 3, and outputs a high-level signal (mismatch detection signal) S2 to the positive-logic OR gate 46. Then the positive-logic OR gate 48 outputs the high-level signal to the negative-logic OR gate 49 in response to the mismatch detection signal S2. Hence, the OR gate 49 prevents the external clock signal CLK from passing therethrough. That is, the output signal of the OR gate 49 is fixed at the high level. Hence, the frequency divider 41 fixes the sub-frame pattern timing signal FP2 at the high level. When the mismatch detector 45 determines that the sub-frame pattern detection signal FP2D is received while the sub-frame pattern timing signal FP2 is fixed at the high level, the mismatch detector 45 generates a low-level signal (match detection signal). It will be noted that the sub-frame pattern detection signal FP2D is received when the sub-frame pattern timing signal FF2 is received if the receiver system is synchronized with the second sub-frame 3.

A synchronization protection circuit 47 has an input terminal connected to the OR gates 46 and 48, and an output terminal connected to the OR gate 51. When the unit 47 determines that the match detection signal has been repeatedly received a predetermined number of times, it outputs a low-level output signal to the OR gate 51. Until the match detection signal has been received the predetermined number of times, the unit 47 outputs a high-level output signal to the OR gate 51.

The output signal of the OR gate 46 is connected to the OR gate 48, to which an output signal OUT1 from the selector 50 is applied. When the output signal OUT1 from the selector 50 is maintained at the low level, the synchronization detecting circuit 40-1 is enabled to execute the hunting operation. The output signal of the gate 48 is particularly referred to as a clock inhibit signal. Further, the output signal of the OR gate 46 is applied, as an input signal IN1, to the selector 50.

Each of the other synchronization detecting circuits 40-2–40-n has the same configuration as the synchronization detecting circuit 40-1. The output terminals of the protection circuits 47 of the synchronization detecting circuits 40-1–40t are connected to the OR gate 51. When one of the synchronization protection circuits 47 of the synchronization detecting circuits 40-1–40t outputs a synchronization protection releasing signal to the OR gate 51, the OR gate 51 allows the external clock signal CLK to pass through the AND gate 52, The output signals of the OR gate 46 of the synchronization detecting circuits 40-1–40-n are applied, as input signals IN1–INn to the selector 50. Output signals OUT1–OUTn of the selector 50 are applied to the synchronization detecting circuits 40-1–40t, respectively.

Figures 6A, 6B:
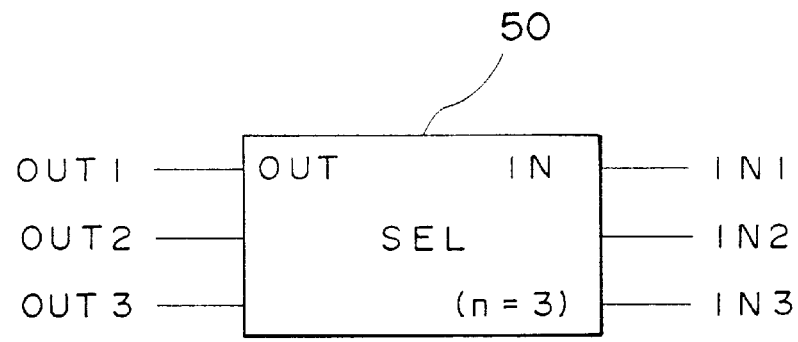
FIG. 6A is a block diagram of a selector shown in FIG. 5.
FIG. 6B is a block diagram illustrating the operation of the selector shown in FIG. 6A.

FIG. 6A is a block diagram of the selector 50, and FIG. 6B is a table showing the relationship between the input signals and output signals of the selector 50 in a case where t=3. The selector 50 can be formed with a ROM. When the input signal IN1 is at the high level (H), the corresponding synchronization detecting circuit 40-1 is not yet in phase with the received data. When the input signal IN1 is at the low level (L), the corresponding synchronization detecting circuit 40-1 is in phase with the received data. Further, when the input signal IN1 is at the low level, the corresponding output signal OUT1 is maintained at the low level. In addition, the output terminal OUT2 which is assigned the smallest number other than the output signal OUT1 corresponding to the low-level input signal IN1 is also maintained at the low level. The above holds true for the other input signals IN2 and IN3. When the output signal OUT1 is at the low level, the corresponding synchronization detecting circuit 40-1 is enabled to perform the hunting (synchronizing) operation. When the output signal OUT1 is at the high level, the corresponding synchronization detecting circuit 40-1 is disabled and does not execute the hunting operation.

It should be noted that the synchronization detecting circuits 40-1–40*t* are selectively enabled on the basis of the output signals of the OR gates 46 of the synchronization detecting circuits 40-1–40*t*.

The timing generator 53 receives the output signal of the AND gate 52 and the external clock signal CLK, and generates a separation timing signal used for separating pieces of data assembled in the frame format shown in FIG. 1. It will be noted that the separation timing signal is generated in accordance with the synchronization protection releasing signal last output from one of the protection circuits 47.

Figure 7:
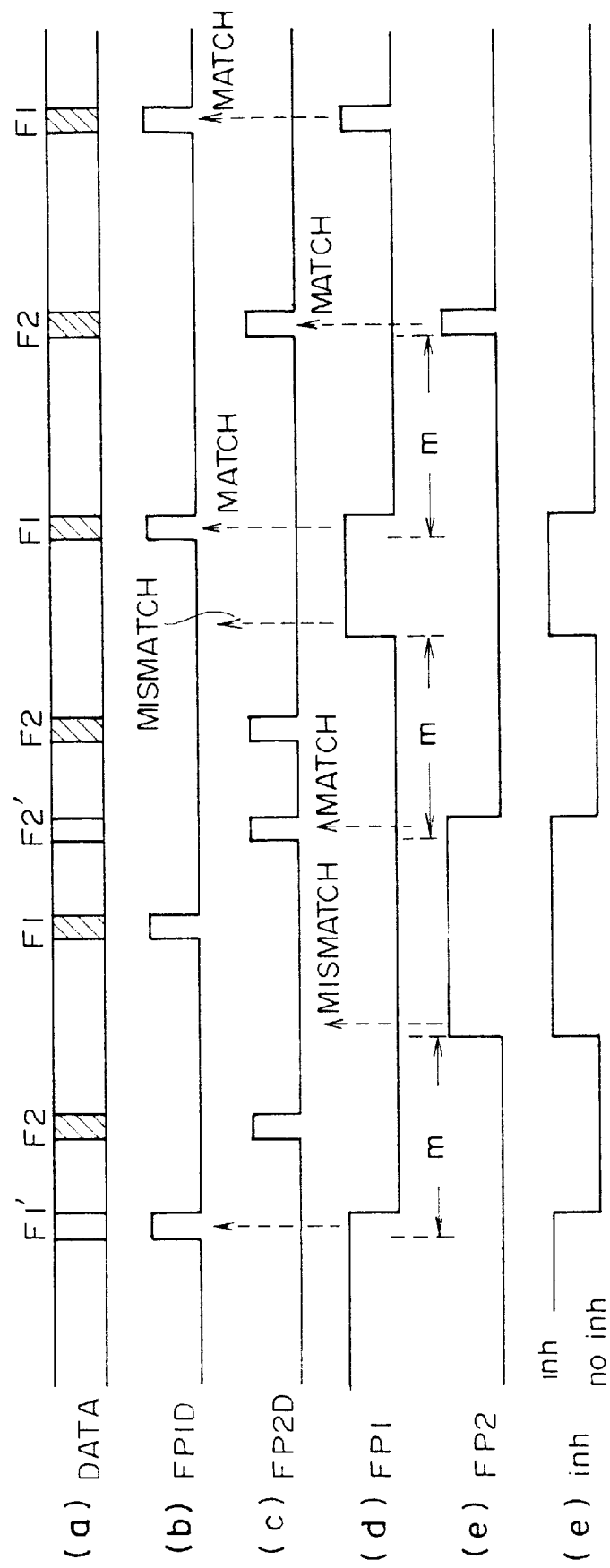
FIG. 7 is a timing chart illustrating the operation of the synchronizing system shown in FIG. 5.

A description will now be given, with reference to FIG. 7, of the operation of the first embodiment of the present invention. FIG. 7 shows the operation of the synchronization detecting circuit 40-1 shown in FIG. 5. The other synchronization detecting circuits 40-2 to 40*t* will operate in the same way as the synchronization detecting circuit 40-1.

A pseudo sub-frame pattern F1' is received in the state in which the sub-frame pattern timing signal FP1 output by the frequency divider 41 is maintained at the high level, as shown in FIG. 7(*a*) and FIG. 7(*d*). In response to the pseudo sub-frame pattern F1', the first sub-frame pattern detector 42 outputs the sub-frame pattern detection signal to the mismatch detector 44, which outputs the match detection signal (low level signal) to the OR gate 46. Thereby, the clock inhibit signal which is the output signal of the OR gate 48 is switched to the low level, as shown in FIG. 7(*f*). Then, the sub-frame pattern timing signal output by the frequency divider 41 is switched to the low level, as shown in FIG. 7(*d*).

As shown in FIG. 7(*e*), the frequency divider 41 switches the sub-frame pattern timing signal FP2 to the high level at the time corresponding to the mth bit from the beginning of the sub-frame pattern (F1) 2*a*. At this time, the mismatch detector 45 outputs the mismatch detection signal (high-level signal) to the OR gate 46. Hence, the clock inhibit signal output from the OR gate 48 is switched to the high level (turned ON), and the sub-frame pattern timing signal FF2 is maintained at the high level.

In this state, the second sub-frame pattern detector 43 detects a pseudo frame pattern F2' and outputs the detection signal FP2D to the mismatch detector 45, as shown in FIG. 7(*a*) and FIG. 7(*c*). The mismatch detector 45 outputs the match detection signal (low-level signal) to the OR gate 46. Accordingly, the output signal of the OR gate 48 is switched to the low level, and the OR gate 49 allows the external clock signal CLK to be applied to the frequency divider 41.

As shown in FIG. 7(*d*), the frequency divider 41 switches the sub-frame pattern timing signal FP1 to the high level at the time corresponding to the mth bit from the beginning of the sub-frame pattern (F2) 3*a*. At this times the mismatch detector 44 outputs the mismatch detection signal (high-level signal) to the OR gate 46. Hence, the clock inhibit signal output from the OR gate 48 is switched to the high level, and the sub-frame pattern timing signal FP1 is maintained at the high level.

As shown in FIG. 7(*a*) and FIG. 7(*b*), the first sub-frame pattern detector 42 detects the true sub-frame pattern (F1) 2*a* and outputs the sub-frame pattern detection signal FP1D to the mismatch detector 44. Since the sub-frame pattern timing signal FP1 is maintained at the high level, the mismatch detector 44 outputs the match detection signal to the OR gate 46. Hence, the external clock signal CLK is allowed to pass through the OR gate 49. The frequency divider 41 generates the sub-frame pattern timing signal FP2 at the mth bit from the beginning of the sub-frame pattern (F1) 2*a*, as shown in FIG. 7(*e*). At this time, the second sub-frame pattern detector 43 detects the true frame pattern (F2) 3*a*, and outputs the detection signal FP2D to the mismatch detector 45, as shown in FIG. 7(*e*). Then, the mismatch detector 45 outputs the match detection signal to the OR gate 46.

As shown in FIG. 7(*a*) and FIG. 7(*b*), the first sub-frame pattern detector 42 detects the true sub-frame pattern (F1) 2*a* and outputs the sub-frame pattern detection signal FP1D to the mismatch detector 44. The frequency divider 41 outputs the sub-frame pattern timing signal FP1 to the mismatch detector 44 at the mth bit from the beginning of the frame pattern, as shown in FIG. 7(*d*). At this time, the mismatch detector 44 outputs the match detection signal to the OR gate 46.

In the above-mentioned manner, the true sub-frame patterns 2*a* and 3*a* of the first and second sub-frames 2 and 3 are alternately searched for. Generally, the (i+1)th sub-frame pattern with the predetermined period (=m) is searched for after the ith sub-frame pattern is identified (i=1 for the format shown in FIG. 1). When the true frame patterns 2*a* and 3*a* have been identified, the synchronization detecting circuit is maintained in the stable state synchronized with the true sub-frame patterns 2*a* and 3*a*.

It will now be assumed that there are three synchronization detecting circuits 40-1, 40-2 and 40-3. As shown in FIGS. 6A and 6B, the output terminal OUT1 assigned the smallest number is maintained at the low level and the other output terminals OUT2 and OUT3 are maintained at the high level when the input signals IN1, IN2 and IN3 are maintained at the high level, in other words, when the synchronization detecting circuits 40-1, 40-2 and 40-3 have not yet detected the sub-frame patterns 2*a* and 3*a* at all.

When the input signal IN1 assigned the smallest number is maintained at the low level and the other input signals IN2 and IN3 are maintained at the high level, the output terminal OUT1 assigned the smallest number and the output terminal OUT2 assigned the second smallest number are maintained at the low level and the remaining output terminal OUT3 is maintained at the high level.

When the input signal IN1 assigned the smallest number and the input signal IN2 assigned the second smallest number are maintained at the low level and the other input signal IN3 is maintained at the high level the output terminal OUT1 assigned the smallest number and the output terminal OUT3 assigned the third smallest number are maintained at the low level and the output terminal assigned the second smallest number is maintained at the low level.

In the above manner, when an input signal is at the low level, the corresponding output signal is also maintained at the low level and one of the other output signals is also maintained at the low level in such a manner that the output signal assigned the smallest number is maintained at the low level. In this manner, two or more synchronization detecting circuits can be prevented from concurrently operating with respect to the same frame pattern detection signal FP1D or FP2D.

According to the first embodiment of the present invention, the detection of a mismatch is carried out in the period corresponding to the length of the sub-frame 2 or 3. When a mismatch is detected at the mth bit of the sub-frame length after a match is detected, the external clock is inhibited from being applied to the frequency divider 41. Hence, the time necessary to search for the true sub-frame patterns 2*a* and 3*a* can be greatly reduced Further, the synchronizing detection is not greatly affected by the presence of pseudo sub-frame patterns.

Figure 8:
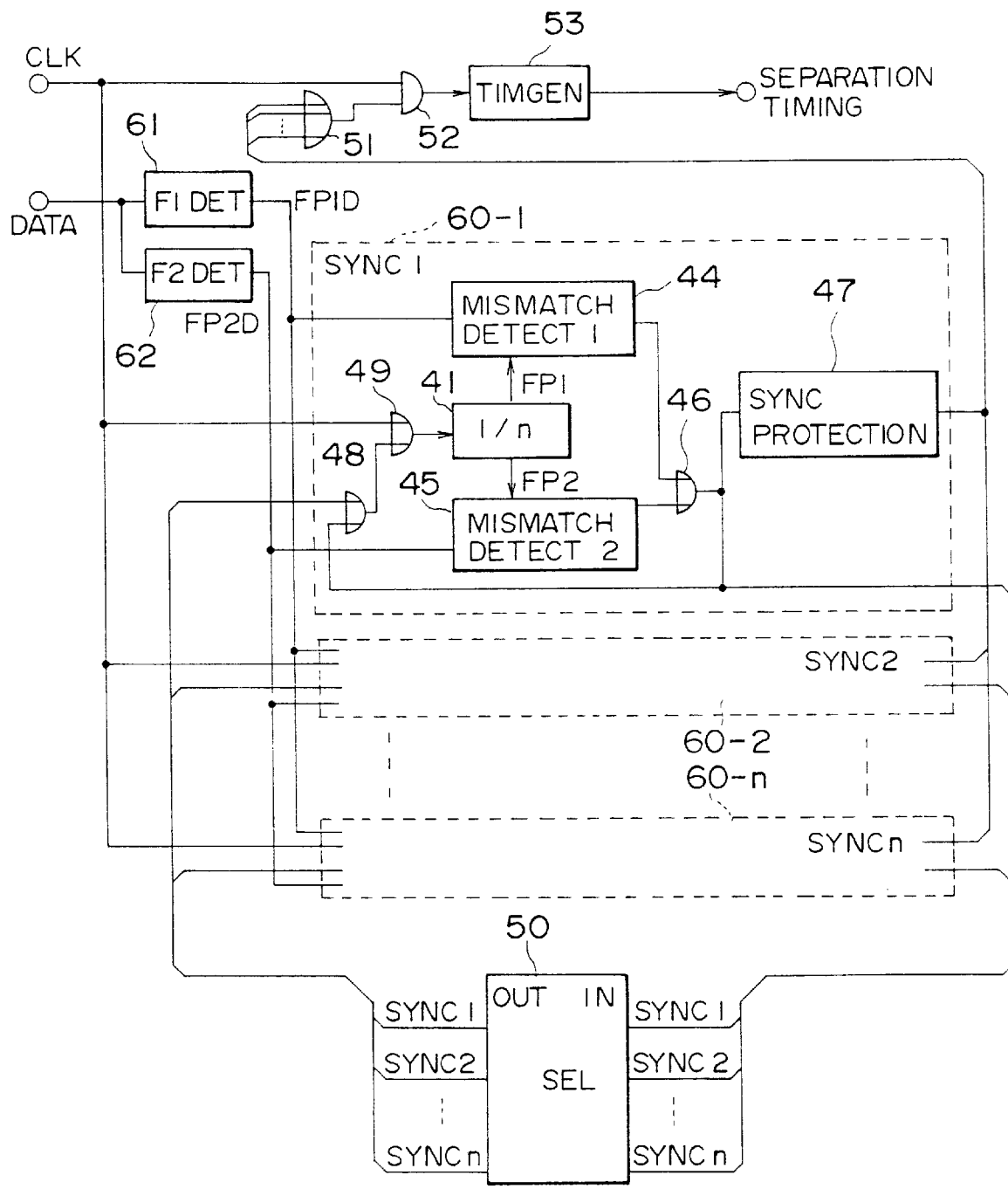
FIG. 8 is a block diagram of a synchronizing system according to a second embodiment of the present invention.

A description will now be given of a second embodiment of the present invention with reference to FIG. 8, in which parts that are the same as parts shown in FIG. 5 are given the same reference numbers. The second embodiment of the present invention includes synchronization detecting circuits 60-1–60-n, each of which does not have the built-in first and second sub-frame pattern detectors 42 and 43 shown in FIG. 5. Instead, first and second sub-frame pattern detectors 61 and 62 are provided in common to the synchronization detecting circuits 60-1–60t, as shown in FIG. 8. The first sub-frame pattern detector 61 is the same as the first sub-frame pattern detector 42 used in the first embodiment, and the second sub-frame pattern detector 62 is the same as the second sub-frame pattern detector 43. The output terminal of the first sub-frame pattern detector 61 is connected in common to the input terminals of the mismatch detector 44 of the synchronization detecting circuits 60-1–60t. The output terminal of the second sub-frame pattern detector 62 is connected in common to the input terminals of the mismatch detector 45 of the synchronization detecting circuits 60-1–60t.

The second embodiment of the present invention is simpler than the first embodiment of the present invention.

Figure 9:
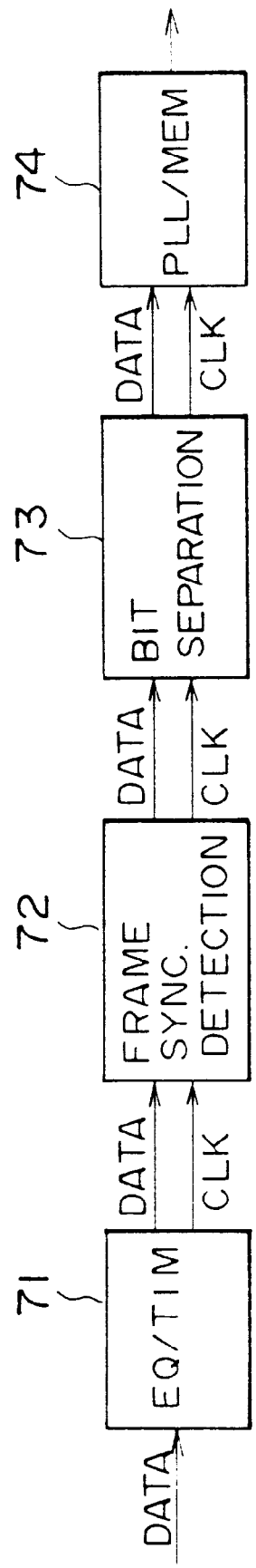
FIG. 9 is a block diagram of a communications device to which the present invention is applied.

The present invention can be applied to, for example, a communications device shown in FIG. 9. The communications device shown in FIG. 9 is made up of an equalizer/timing generator 71, a frame synchronization device 72, a bit separation device 73, and a PLL/memory 74. The frame synchronization device 72 is configured according to the present invention. The equalizer/timing generator 71 compensates for loss in a transmission line via which data is transferred, and generates a clock signal CLK from the received data. The frame synchronization device 72 has the configuration shown in FIG. 5 or FIG. 8. The bit separation device 73 receives the separation timing signal and the data signal from the frame synchronization device 72. The data signal DATA shown in FIG. 5 or FIG. 8 is applied to the bit separation device 73 via a line (not shown for the sake of simplicity). The bit separation device 73 separates pieces of various control data from the received data in accordance with the separation timing signal. The PLL/memory 74 stores data other than separated control data in a built-in memory, and reads the data therefrom in accordance with a smoothed clock signal generated by a built-in PLL circuit.

The present invention is not limited to the specifically disclosed embodiments, and variations and modifications may be made without departing from the scope of the present invention.

What is claimed is:

1. A synchronizing system for hunting sub-frame patterns respectively distributed in sub-frames in one frame of data transmitted via a transmission line, said synchronizing system comprising:

a plurality of detection circuits, each of said plurality of detection circuits including:

detection means for respectively detecting a corresponding plurality of sub-frame patterns;

sub-frame pattern timing signal generating means for generating a plurality of sub-frame pattern timing signals respectively related to said plurality of sub-frame patterns;

mismatch detection means, respectively coupled to said detection means and said sub-frame pattern timing signal generating means, for determining whether or not said detection means detects said plurality of sub-frame patterns at timings respectively specified by the plurality of sub-frame pattern timing signals, wherein said mismatch detection means determines whether or not each successive sub-frame pattern is detected within a given data length after a preceding sub-frame pattern is detected; and selector means, directly connected to each of said detection circuits for selectively enabling one or more of said detection circuits at a time to detect the plurality of sub-frame patterns.

2. The synchronizing system as claimed in claim 1, wherein:

said sub-frame pattern timing signal generating means generates the plurality of sub-frame pattern timing signals from an external clock signal; and the synchronizing system further comprises gate means for selectively supplying the external clock signal to said sub-frame pattern timing signal generating means on a basis of a result of determination by said mismatch detection means.

3. The synchronizing system as claimed in claim 1, wherein said selector means selectively enables the detection circuits to detect said plurality of sub-frame patterns so that at least one of the detection circuits initially executes a sub-frame pattern detecting operation at a timing different from that of sub-frame pattern detecting operations of other detection circuits.

4. A synchronizing system for hunting sub-frame patterns respectively distributed in sub-frames in one frame of data transmitted via a transmission line, said synchronizing system comprising:

a plurality of detection circuits, each of said plurality of detection circuits including:

detection means for respectively detecting a corresponding plurality of sub-frame patterns:

sub-frame pattern timing signal generating means for generating a plurality of sub-frame pattern timing signals respectively related to said plurality of sub-frame patterns;

mismatch detection means, respectively coupled to said detection means and said sub-frame pattern timing signal generating means, for determining whether or not said detection means detects said plurality of sub-frame patterns at timings respectively specified by the plurality of sub-frame pattern timing signals, wherein said mismatch detection means determines whether or not each successive sub-frame pattern is detected within a given data length after a preceding sub-frame pattern is detected; and selector means, coupled to each of said detection circuits for selectively enabling one or more of said detection circuits at a time to detect the plurality of sub-frame patterns, synchronization protection means provided in each of the detection circuits, for generating a protection releasing signal when the sub-frame patterns are detected within the given data length a predetermined number of hunting times; and gate means, coupled to each said synchronization protection means, for generating a gate signal on the basis of protection releasing signals from the plurality of synchronization protection means;

said sub-frame pattern timing signal generating means being coupled to said gate means, for generating a separation timing signal on the basis of the gate signal, said separation timing signal being used to separate pieces of data in a plurality of subframes from each other.

5. A synchronizing system for hunting sub-frame patterns respectively distributed in sub-frames in one frame of data transmitted via a transmission line, said synchronizing system comprising:

a plurality of detection circuits, each of said plurality of detection circuits including:

detection means for respectively detecting a corresponding plurality of sub-frame patterns;

sub-frame pattern timing signal generating means for generating a plurality of sub-frame pattern timing signals respectively related to said plurality of sub-frame patterns;

mismatch detection means, respectively coupled to said detection means and said sub-frame pattern timing signal generating means, for determining whether or not said detection means detects said plurality of sub-frame patterns at timings respectively specified by the plurality of sub-frame pattern timing signals, wherein said mismatch detection means determines whether or not each successive sub-frame pattern is detected within a given data length after a preceding sub-frame pattern is detected;

synchronization protection means provided in each of the detection circuits, for generating a protection releasing signal when the sub-frame patterns are detected within the given data length a predetermined number of hunting times;

gate means, coupled to each said synchronization protection means, for generating a gate signal on the basis of protection releasing signals from the plurality of synchronization protection means; and said sub-frame pattern timing signal generating means being coupled to said gate means, for generating a separation timing signal on the basis of the gate signal, said separation timing signal being used to separate pieces of data in a plurality of sub frames from each other.

* * * * *